US011722978B2

(12) United States Patent
Bao et al.

(10) Patent No.: US 11,722,978 B2
(45) Date of Patent: Aug. 8, 2023

(54) SIGNALING TIMING ERROR GROUP UPDATES FOR POSITIONING

(71) Applicant: QUALCOMM Incorporated, San Diego, CA (US)

(72) Inventors: Jingchao Bao, San Diego, CA (US); Sony Akkarakaran, Poway, CA (US); Alexandros Manolakos, Escondido, CA (US); Sven Fischer, Nuremberg (DE); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/222,584

(22) Filed: Apr. 5, 2021

(65) Prior Publication Data
US 2022/0322267 A1 Oct. 6, 2022

(51) Int. Cl.
H04W 56/00 (2009.01)
H04W 24/10 (2009.01)
H04W 64/00 (2009.01)
H04L 5/00 (2006.01)

(52) U.S. Cl.
CPC ....... H04W 56/0055 (2013.01); H04L 5/0048 (2013.01); H04W 24/10 (2013.01); H04W 64/00 (2013.01)

(58) Field of Classification Search
CPC . H04W 56/0055; H04W 24/10; H04W 64/00; H04L 5/0048
See application file for complete search history.

(56) References Cited

U.S. PATENT DOCUMENTS

| 2015/0141048 | A1* | 5/2015 | Woo | G01S 5/10 455/456.1 |
|---|---|---|---|---|
| 2020/0137607 | A1 | 4/2020 | Akkarakaran et al. | |
| 2020/0205104 | A1 | 6/2020 | Akkarakaran et al. | |
| 2022/0132372 | A1* | 4/2022 | Narasimha | H04W 88/085 |
| 2022/0217774 | A1* | 7/2022 | Kim | H04L 5/0007 |
| 2022/0229146 | A1 | 7/2022 | Ko et al. | |

FOREIGN PATENT DOCUMENTS

WO    2020222519 A1    11/2020

OTHER PUBLICATIONS

International Search Report and Written Opinion—PCT/US2022/014846—ISA/EPO—Jun. 8, 2022.
Qualcomm Incorporated: "Enhancements on Timing Error Mitigations for Improved Accuracy", 3GPP TSG RAN WG1 #104-e, R1-2101468, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, pp. 1-12, Jan. 19, 2021, XP051971633.

* cited by examiner

Primary Examiner — Natasha W Cosme
(74) Attorney, Agent, or Firm — Sunstein LLP/Qualcomm

(57) ABSTRACT

Techniques are provided for signaling timing error group (TEG) updates for positioning. An example for providing reference signal measurement values with a mobile device incudes measuring one or more reference signals, determining a timing error change associated with one or more reference signal measurement values, and transmitting the one or more reference signal measurement values and an indication of the timing error change.

30 Claims, 12 Drawing Sheets

SIGNALING TIMING ERROR GROUP UPDATES FOR POSITIONING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination. Timing errors associated with the processing of such reference signals may impact the accuracy of the result position estimates.

SUMMARY

An example for providing reference signal measurement values with a mobile device according to the disclosure incudes measuring one or more reference signals, determining a timing error change associated with one or more reference signal measurement values, and transmitting the one or more reference signal measurement values and an indication of the timing error change.

Implementations of such a method may include one or more of the following features. The timing error change may be based at least in part on an orientation of the mobile device relative to a transmission path of at least one of the one or more reference signals. The timing error change may be based at least in part on a temperature of the mobile device. The one or more reference signal measurement values may be transmitted in a report and the indication of the timing error change includes a toggle bit in the report. The indication of the timing error change may include a counter value in a report. The indication of the timing error change may include a toggle bit for each of the one or more reference signal measurement values. The indication of the timing error change may include a counter value for each of the one or more reference signal measurement values. The indication of the timing error change may include a counter value for each of the one or more reference signal measurement values. The indication of the timing error change may include a timing error group identification value for each of the one or more reference signal measurement values. The one or more reference signal measurement values and the indication of the timing error change may be transmitted to a location server. The one or more reference signal measurement values and the indication of the timing error change may be transmitted to a user equipment. The one or more reference signal measurement values and the indication of the timing error change may be transmitted via a sidelink communication protocol.

An example method for determining a location of a station according to the disclosure includes obtaining a plurality of reference signal measurement values and timing error group information from the station, determining at least a first subset of the plurality of reference signal measurement values based at least in part on the timing error group information, wherein each of the plurality of reference signal measurement values in the first subset of the plurality of reference signal measurement values have a first timing error value, and determining the location of the station based at least in part on the first subset of the plurality of reference signal measurement values.

Implementations of such a method may include one or more of the following features. The plurality of reference signal measurement values may be transmitted in a report and the timing error group information includes a toggle bit in the report. The timing error group information may include a counter value in a report. The timing error group information may include a toggle bit for each of the plurality of reference signal measurement values. The timing error group information may include counter value for each of the plurality of reference signal measurement values. The timing error group information may include a timing error group identification value for each of the plurality of reference signal measurement values. The plurality of reference signal measurement values and the timing error group information may be received from a user equipment. The plurality of reference signal measurement values and the timing error group information may be received via a sidelink communication protocol. The method may further include determining at least a second subset of the plurality of reference signal measurement values based at least in part on the timing error group information, such that each of the plurality of reference signal measurement values in the second subset of the plurality of reference signal measurement values is based on a second timing error value, and determining the location of the station based at least in part on the second subset of the plurality of reference signal measurement values.

An example apparatus according to the disclosure includes a memory, at least one transceiver, at least one processor communicatively coupled to the memory and the at least one transceiver, and configured to measure one or more reference signals, determine a timing error change associated with one or more reference signal measurement values, and transmit the one or more reference signal measurement values and an indication of the timing error change.

Implementation of such an apparatus may include one or more of the following features. The at least one processor may be further configured to determine an orientation of the apparatus relative to a transmission path of at least one of the one or more reference signals, such that the timing error change is based at least in part on the orientation of the apparatus. The apparatus may include at least one temperature sensor, and the at least one processor may be configured to determine the timing error change based at least in part on a measurement obtained with the at least one temperature sensor. The one or more reference signal measurement values may be transmitted in a report and the indication of the timing error change include at least one of a report toggle bit, a report counter value, a measurement toggle bit, and a measurement counter value in the report. The at least one processor may be further configured to transmit the one or more reference signal measurement values and the indication of the timing error change via a sidelink communication protocol.

An example apparatus according to the disclosure includes a memory, at least one transceiver, at least one processor communicatively coupled to the memory and the at least one transceiver, and configured to obtain a plurality of reference signal measurement values and timing error group information from a station, determine at least a first subset of the plurality of reference signal measurement values based at least in part on the timing error group information, wherein each of the plurality of reference signal measurement values in the first subset of the plurality of reference signal measurement values have a first timing error value, and determine a location of the station based at least in part on the first subset of the plurality of reference signal measurement values.

Implementations of such an apparatus may include one or more of the following features. The plurality of reference signal measurement values may be transmitted in a report and the timing error group information include at least one of a report toggle bit, a report counter value, a measurement toggle bit, and a measurement counter value in the report. The at least one processor may be further configured to receive the plurality of reference signal measurement values and the timing error group information via a sidelink communication protocol. The at least one processor may be further configured to determine at least a second subset of the plurality of reference signal measurement values based at least in part on the timing error group information, such that each of the plurality of reference signal measurement values in the second subset of the plurality of reference signal measurement values is based on a second timing error value, and determine the location of the station based at least in part on the second subset of the plurality of reference signal measurement values.

An example apparatus for providing reference signal measurement values with a mobile device according to the disclosure includes means for measuring one or more reference signals, means for determining a timing error change associated with one or more reference signal measurement values, and means for transmitting the one or more reference signal measurement values and an indication of the timing error change.

An example apparatus for determining a location of a station according to the disclosure includes means for obtaining a plurality of reference signal measurement values and timing error group information from the station, means for determining at least a first subset of the plurality of reference signal measurement values based at least in part on the timing error group information, wherein each of the plurality of reference signal measurement values in the first subset of the plurality of reference signal measurement values have a first timing error value, and means for determining the location of the station based at least in part on the first subset of the plurality of reference signal measurement values.

An example non-transitory processor-readable storage medium comprising processor-readable instructions configured to cause one or more processors to provide reference signal measurement values with a mobile device according to the disclosure includes code for measuring one or more reference signals, code for determining a timing error change associated with one or more reference signal measurement values, and code for transmitting the one or more reference signal measurement values and an indication of the timing error change.

An example non-transitory processor-readable storage medium comprising processor-readable instructions configured to cause one or more processors to determine a location of a station according to the disclosure includes code for obtaining a plurality of reference signal measurement values and timing error group information from the station, code for determining at least a first subset of the plurality of reference signal measurement values based at least in part on the timing error group information, wherein each of the plurality of reference signal measurement values in the first subset of the plurality of reference signal measurement values have a first timing error value, and code for determining the location of the station based at least in part on the first subset of the plurality of reference signal measurement values.

Items and/or techniques described herein may provide one or more of the following capabilities, as well as other capabilities not mentioned. A station, such as user equipment or a base station, may transmit and receive reference signals to determine a location of the station. Time of flight, and other timing measurements, associated with the reference signals may be used to determine a distance between two or more stations. In operation, timing errors associated with transmit and receive chains of the stations may impact the accuracy of a computed position estimate. The timing errors may be categorized into timing error groups (TEGs) and the delay times of a TEG may be used in positioning calculations. The positioning calculations may utilize multiple reference signal measurements and variations in the delay times for a TEG group may impact the accuracy of the resulting position estimate. The current state of a station may impact the time delay of a received and/or transmitted reference signal. A station may be configured to provide TEG update information with reference signal measurements. A positioning entity may utilize the TEG update information to segregate the reference signal measurement such that the measurements with similar TEG delays are grouped together for processing. The position estimates derived from the group of reference signal measurements with similar TEG time delay values may be more accurate than position estimates derived from reference signal measurements obtained with different TEG time delay values. Other capabilities may be provided and not every implementation according to the disclosure must provide any, let alone all, of the capabilities discussed.

DETAILED DESCRIPTION

Figure 1:
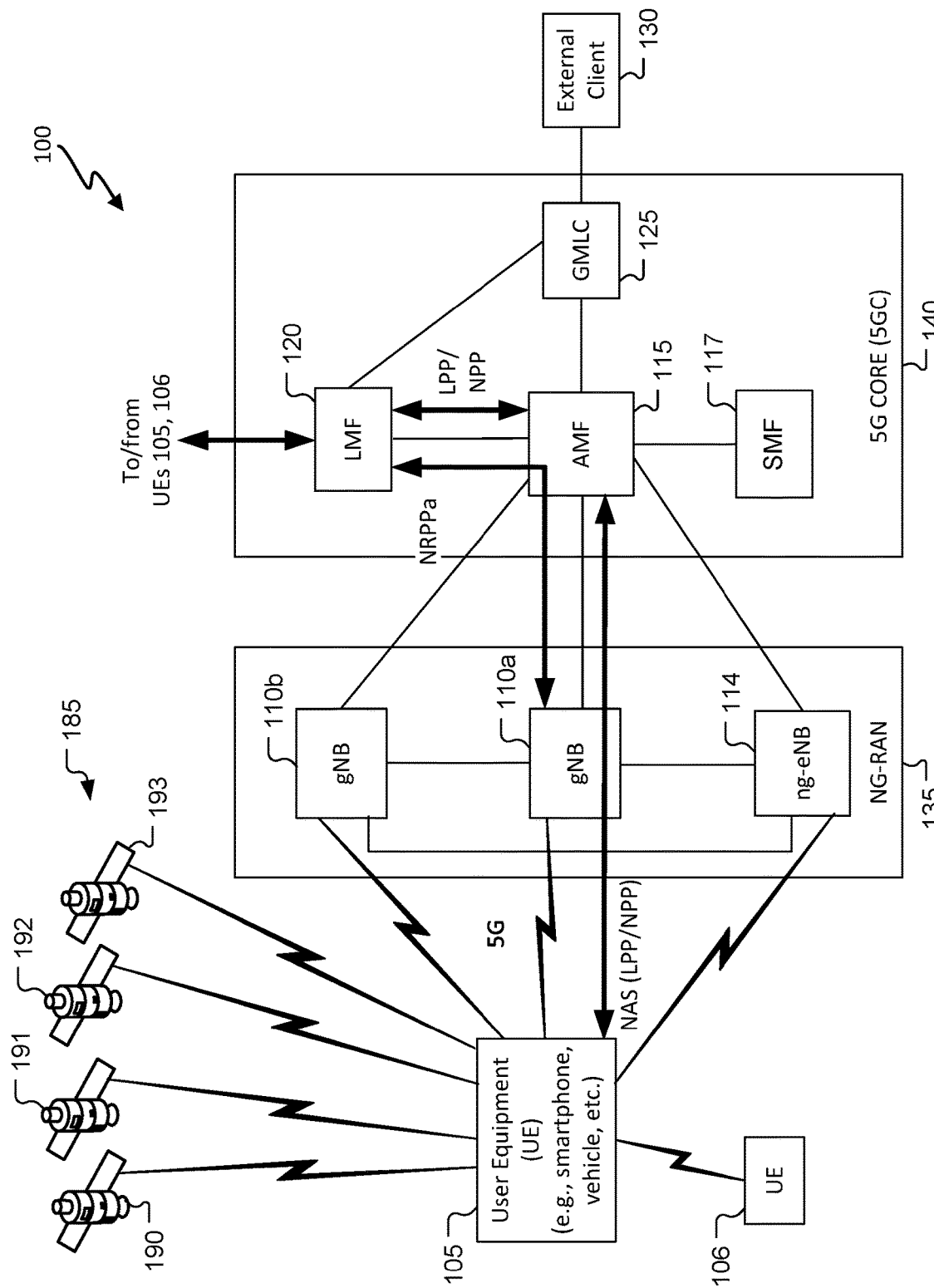
FIG. 1 is a simplified diagram of an example wireless communications system.

Techniques are discussed herein for signaling timing error group (TEG) updates for positioning. Terrestrial time-of-flight positioning techniques such as round trip timing (RTT) and time of arrival (ToA), for example, may be dependent on the accuracy of timing measurements associated with the transmission and reception of reference signals between two or more stations. Even small timing issues may result in very large errors in the corresponding positioning estimates. For example, a time measurement error as small as 100 nanoseconds can result in a localization error of 30 meters. Physical and electrical constraints in a station, such as a user equipment (UE) or a base station (e.g., a transmission/reception point (TRP)), may introduce timing errors associated with the transmission and reception of a reference signal. For example, from a signal transmission perspective, there may be a time delay from the time when the digital signal is generated at baseband to the time when the RF signal is transmitted from a Tx antenna. In terrestrial positioning applications, a station (e.g., UE, TRP, etc.) may implement an internal calibration and/or compensation of the Tx time delay for the transmission of reference signals. For example, downlink positioning reference signals (DL PRS) and/or uplink positioning reference signals (UL PRS)/sounding reference signals (SRS), may include the calibration and/or compensation of the relative time delay between different RF chains in the same station. The compensation may also consider the offset of the Tx antenna phase center to the physical antenna center. The calibration/compensation may not be perfect. The remaining Tx time delay after the calibration, or the uncalibrated Tx time delay is defined as Tx timing error.

From a signal reception perspective, there may be a time delay from a time when an RF signal arrives at an Rx antenna to the time when the signal is digitized and time-stamped at the baseband. In terrestrial positioning applications, the stations (e.g., UE, TRP) may implement an internal calibration and/or compensation of the Rx time delay before the measurements that are obtained from a reference signal (e.g., DL PRS/SRS) are reported. In an example, the measurement reports may include the calibration and/or compensation of the relative time delay between different RF chains in the same station. The compensation may also possibly consider the offset of the Rx antenna phase center to the physical antenna center. The RX calibration, however, may also not be perfect. The remaining Rx time delay after the calibration, or the uncalibrated Rx time delay is defined as Rx timing error.

The timing error group (TEG) information described herein may be based on the TX and RX timing errors associated with one or more reference signal resources, such as DL PRS resources, UL PRS/SRS resources, and Sidelink (SL) PRS resources. The TEG may be associated with one or more different uplink, downlink and/or sidelink signals, and may include TX and RX timing error values within a certain margin. In operation, the actual time delays associated with a TEG may vary within the margin. That is, a particular TEG may cover a range of time delays. For example, physical changes in a device such as a relative orientation to received or transmitted signals, or thermal properties (e.g., temperature/clock drift) may impact the actual timing error. Since a positioning entity may utilize TEG group information for multiple measurements, the change in delay time within a TEG group (e.g., intra-TEG change) may reduce the accuracy of the resulting position estimate. For example, a station may provide a measurement report based on a first TEG (e.g., TEG1) which may have a mean delay of 1 nanosecond (ns). The station may then provide a second measurement report based on TEG1, but the actual delay in the second report may have a mean delay of 2 ns due to changes in thermal properties or other physical factors. Both the first and second reports rely on TEG1 as being a constant value, but the intra-TEG change (i.e., from 1 ns to 2 ns) may impact the resulting position estimates if the measurements from the first and second reports are combined.

In an embodiment, a station may be configured to provide a signal to update a positioning entity of the intra-TEG change. The positioning entity may then utilize the update signal to select subsets of the received measurements with the same intra-TEG delay values. For example, measurement reports may include a toggle bit to indicate that the TEG delay is the same across the reports until the toggle bit changes state (e.g., toggled). The measurement reports may include a counter or timer information element to confirm an intra-TEG delay change as not occurred. In an example, measurement values in the measurement reports may include information elements to indicate an intra-TEG change such that measurements obtained before an intra-TEG change may be grouped into a first subset, and measurements obtained after the intra-TEG change may be grouped into a second subset. Other combinations of report based and measurement based information elements may also be used to update a positioning entity of a change in the delay associated with a TEG. These are examples, and other examples of information elements may be implemented.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), a physical sidelink control channel (PSCCH), a sidelink shared channel (SL-SCH), a sidelink broadcast channel (SL-BCH), and other sidelink synchronization signals.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110*a*, 110*b*, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
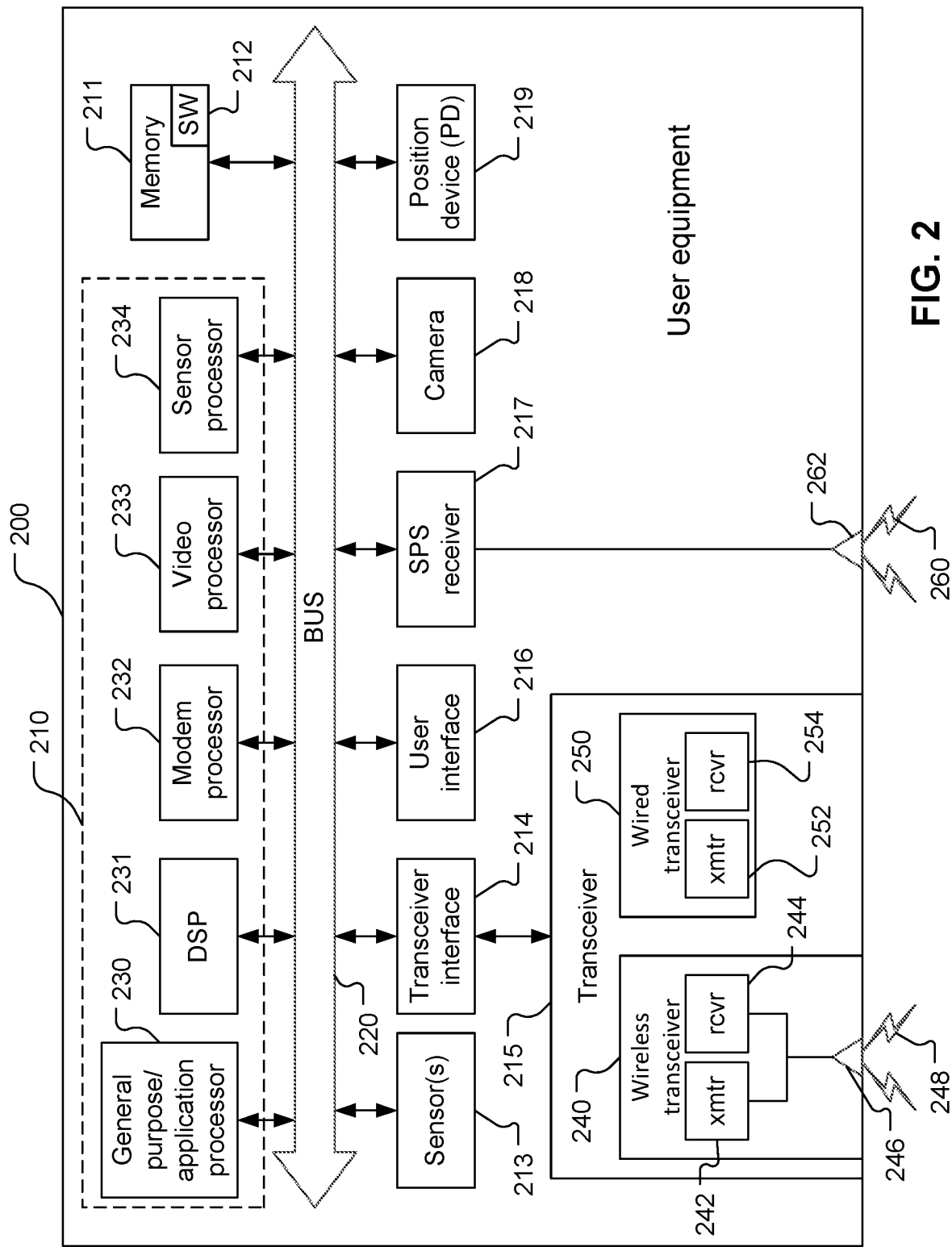
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
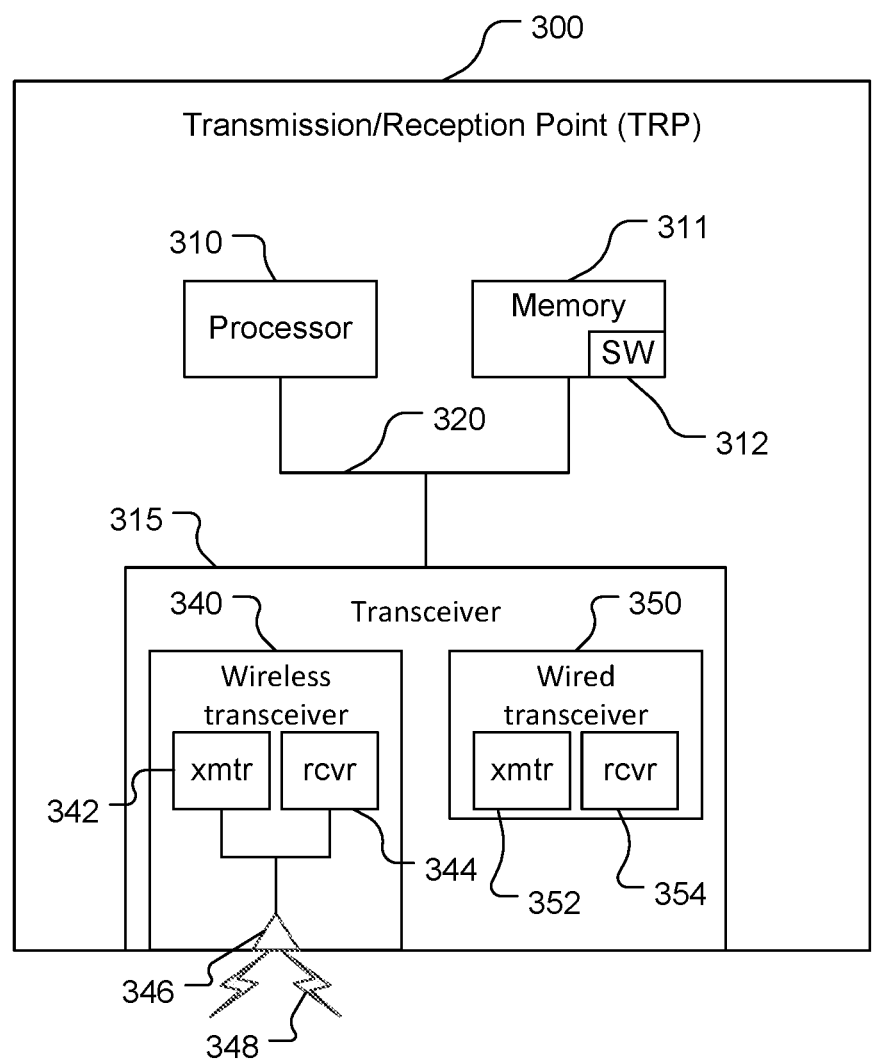
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., with the network 135 to send communications to, and receive communications from, the LMF 120, for example. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
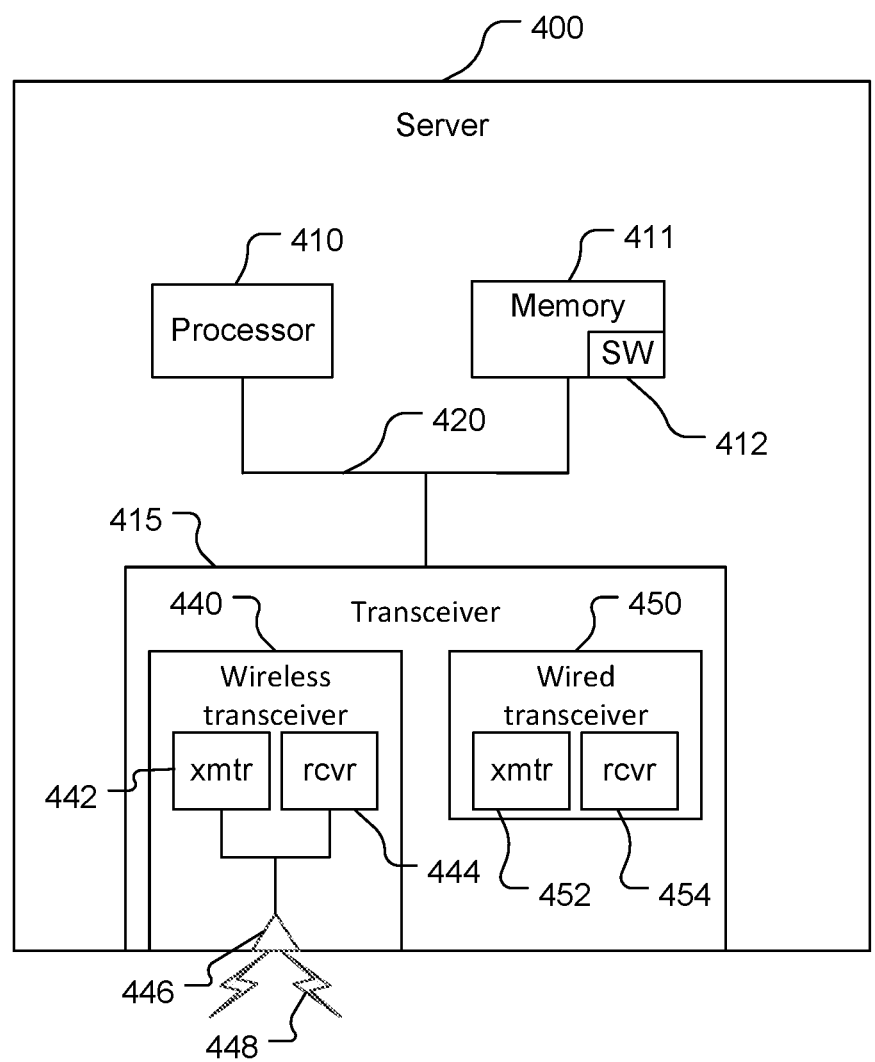
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., with the network 135 to send communications to, and receive communications from, the TRP 300, for example. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element).

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT). In an embodiment, sidelink-based positioning method may also be used. For example, RTT, ToA, and other time-of-flight techniques may be based on reference signals (e.g., SRS) transmitted between UEs.

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
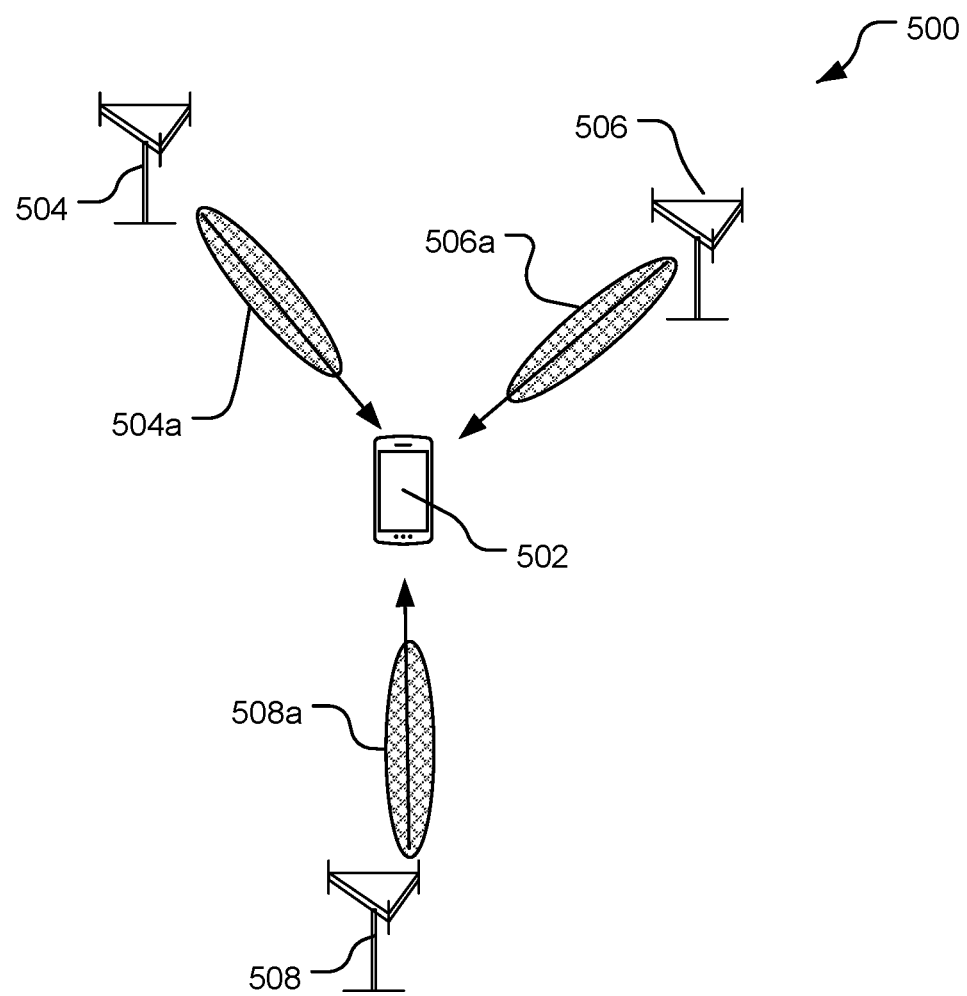
FIG. 5 is a diagram of example downlink positioning reference signals.

Referring to FIG. 5, a diagram 500 of downlink positioning reference signals is shown. The diagram 500 includes a UE 502 and a plurality of base stations including a first base station 504, a second base station 506, and a third base station 508. The UE 502 may have some or all of the components of the UE 200, and the UE 200 may be an example of the UE 502. Each of the base stations 504, 506, 508 may have some or all of the components of the TRP 300, and the TRP 300 may be an example of one or more of the base stations 504, 506, 508. In operation, the UE 502 may be configured to receive one or more reference signals such as a first reference signal 504a, a second reference signal 506a, and a third reference signal 508a. The reference signals 504a, 506a, 508a may be DL PRS or other positioning signals which may be received/measured by the UE 502. While the diagram 500 depicts three reference signals, fewer or more reference signals may be transmitted by the base stations and detected by the UE 502. In general, DL PRS signals in NR may be configured reference signals transmitted by the base stations 504, 506, 508 and used for the purpose of determining respective ranges between the UE 502 and the transmitting base stations. The UE 502 may also be configured to transmit uplink PRS (UL PRS, SRS for positioning) to the base stations 504, 506, 508, and the base stations may be configured to measure the UL PRS. In an example, combinations of DL and UL PRS may be used in a positioning procedure (e.g., RTT) and the TEG information associated with the PRS resources may be used in the positioning calculations.

Figure 6:
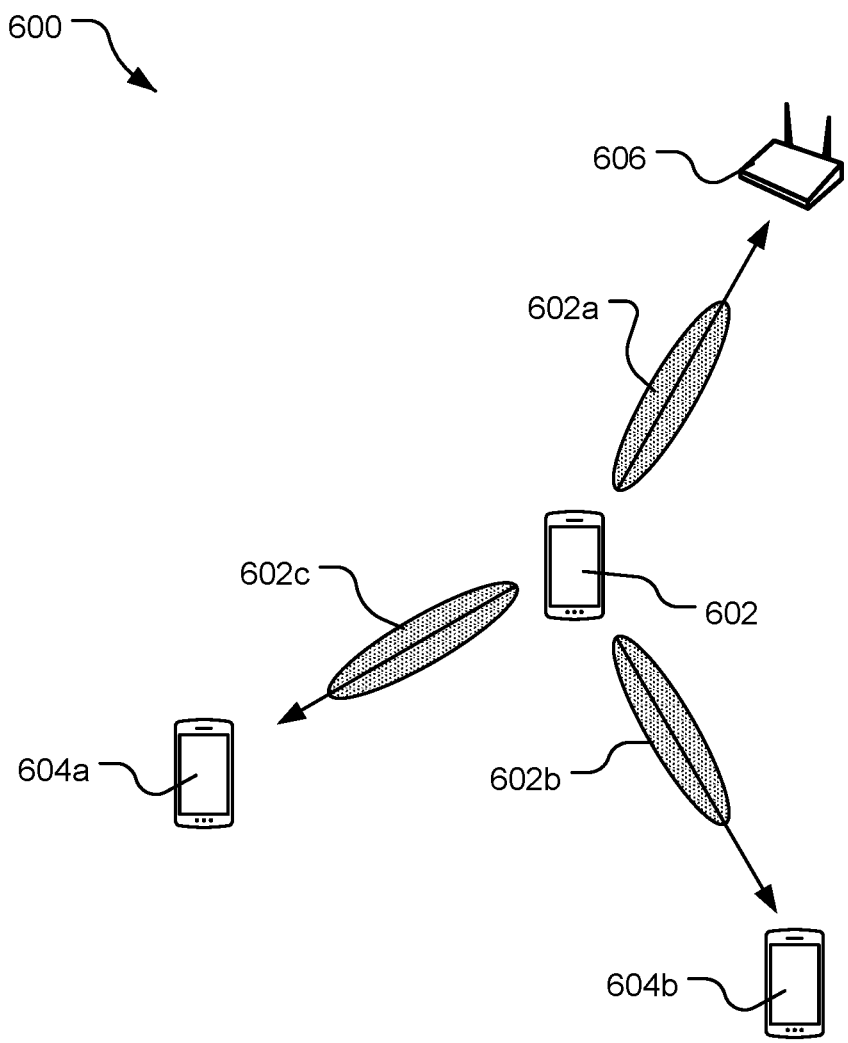
FIG. 6 is a diagram of example sidelink positioning reference signals.

Referring to FIG. 6, a conceptual diagram 600 of sidelink positioning reference signals is shown. The diagram 600 includes a target UE 602 and a plurality of neighboring stations including a first neighbor UE 604a, a second neighbor UE 604b, and a third neighbor station 606. Each of the target UE 602 and the neighbor UEs 604a-b may have some or all of the components of the UE 200, and the UE 200 may be an example of the target UE 602 and the neighbor UEs 604a-b. The station 606 may have some or all of the components of the TRP 300, and the TRP 300 may be an example of the station 606. In an embodiment, the station 606 may be a roadside unit (RSU) in a V2X network. In operation, the target UE 602 may be configured to transmit one or more sidelink reference signals 602a-c via a sidelink channel such as the PSSCH, PSCCH, PSBCH or other D2D interface. In an example, the reference signals may utilize a D2D interface such as the PC5 interface. The reference signals 602a-c may be UL PRS or SRS for positioning signals and may be received by one or more of the neighboring UEs 604a-b, or the station 606. While the diagram 600 depicts three reference signals, few or more reference signals may be transmitted by the target UE 602 and detected by one or more neighboring UEs and stations. In an embodiment, the sidelink reference signals 602a-c may be SRS for positioning resources and may be included in a SRS for positioning resource set. In an example, exchanges of SRS transmissions between stations may be used in a positioning procedure (e.g., RTT) and the TEG information associated with the SRS for positioning resources may be used in positioning calculations.

Figure 7:
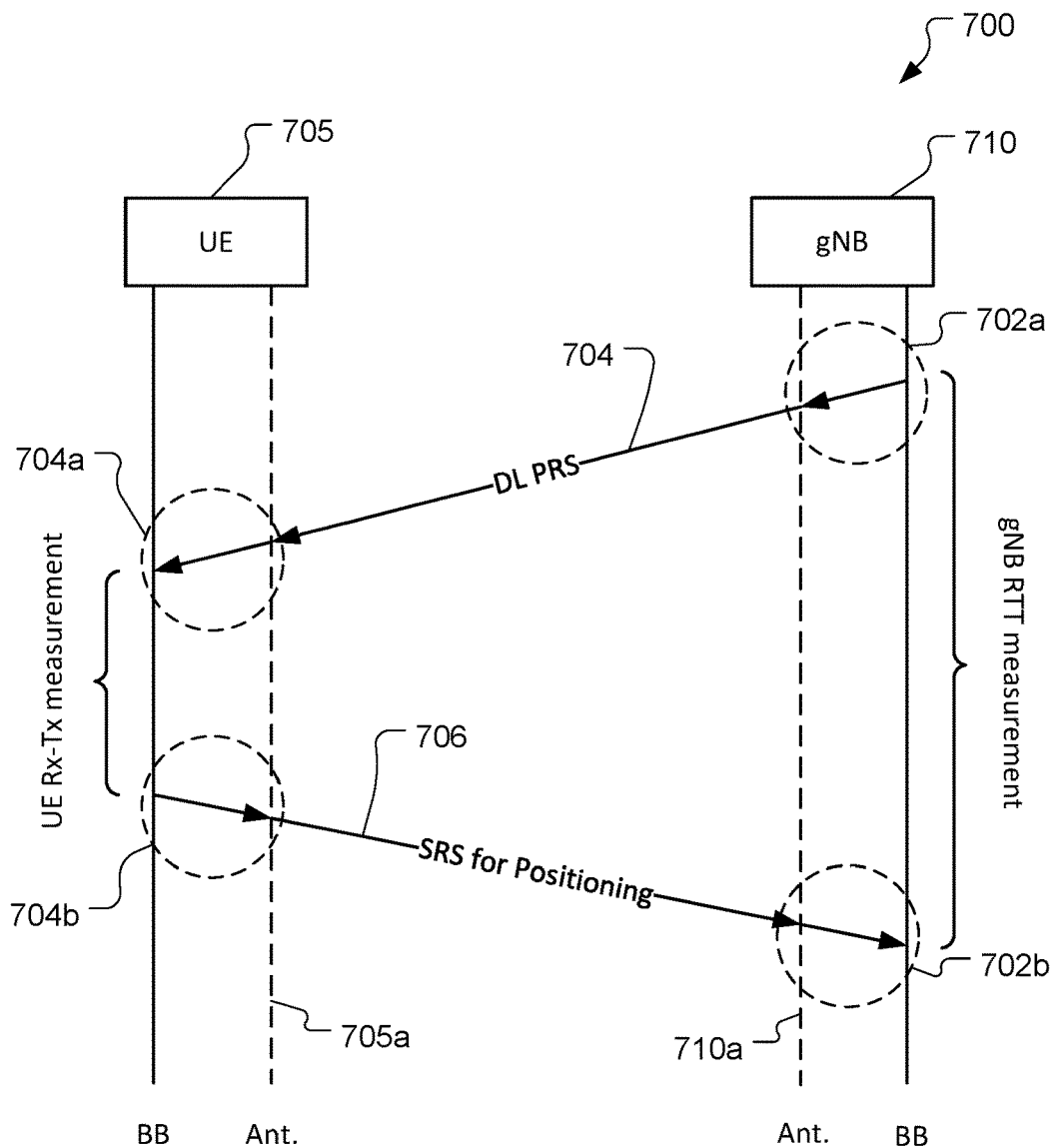
FIG. 7 is a message flow diagram of example impacts of group delay errors within wireless transceivers.

Referring to FIG. 7, a conceptual diagram 700 of example impacts of group delay errors within wireless transceivers are shown. The diagram 700 depicts an example RTT exchange used for positioning a client device. For example, a target UE 705, such as the UE 200, and a base station 710, such as a gNB 110a, may be configured to exchange positioning reference signals such as a downlink (DL) PRS 704 and an SRS for positioning signal 706 (which may also be an UL PRS). The target UE 705 may have one or more antennas 705a and associated base band processing components. Similarly, the base station 710 may have one or more antennas 710a and base band processing components. The respective internal configurations of the target UE 705 and the base station 710 may cause delay times associated with the transmission and reception of PRS signals. In general, a group delay is a transit time of a signal through a device versus frequency. For example, a $BS_{TX}$ group delay 702a represents the difference in time the base station 710 records the transmission of the DL PRS 704 and the time the signal leaves the antenna 710a. A $BS_{RX}$ group delay 702b represents the difference in time the SRS for positioning signal 706 arrives at the antenna 710a and the time the processors in the base station 710 receive an indication of the SRS for positioning signal 706. The target UE 705 has similar group delays such as the $UE_{RX}$ group delay 704a and the $UE_{TX}$ group delay 704b. The group delays associated with the network stations may create a bottleneck for terrestrial based positioning because the resulting time differences lead to inaccurate position estimates. For example, a 10 nanosecond group delay error equates to approximately a 3 meter error in the position estimate. Different frequencies may have different group delay values in a transceiver, thus different PRS and SRS resources may be associated with different timing error groups (TEGs). Other electrical and physical features may further impact the actual delay time within a TEG. For example, changes in orientation relative to received and/or transmitted beams may utilize different antenna elements and may cause different levels of delay. Thermal properties of the receive and transmit chains may cause clock drift and degrade the quality of a TEG calibration. Other variations of system, signal and/or beam parameters may also be used to detect intra-TEG delay changes.

Figure 8:
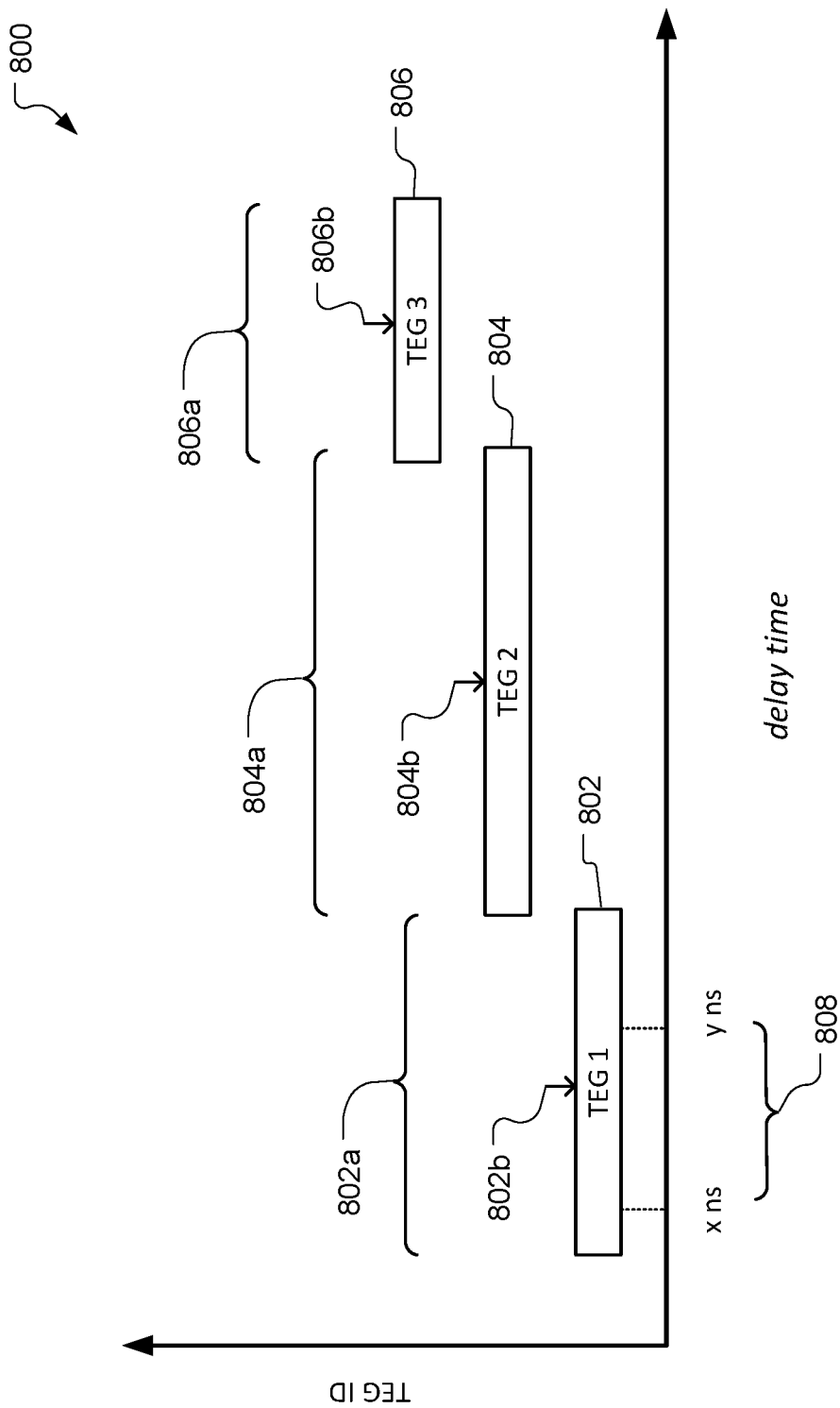
FIG. 8 are example timing error groups (TEGs) with an example of an intra-TEG timing error.

Referring to FIG. 8, a graph 800 of example timing error groups (TEGs) with an example intra-TEG timing error are shown. The graph 800 includes three example TEGs including a first TEG 802, a second TEG 804, and a third TEG 806. The number, relative positions, and associated time delays for the TEGs are examples only, and not limitations as different numbers of groups, relative orientations, and durations are possible. Each of the TEGs 802, 804, 806 may be identified with a TEG identification value (e.g., TEG1, TEG2, TEG3) and may be associated with delay times within established margins. For example, the first TEG 802 may include delay times in a first range 802a, the second TEG 804 may include delay times in a second range 804a, and the third TEG 806 may include delay times in a third range 806a. In an example, the ranges 802a, 804a, 806a may represent uncertainties around a mean delay time for each respective TEG. For example, the first TEG 802 may have a first mean delay value 802b, the second TEG 804 may have a second mean delay value 804b, and the third TEG may have a third mean delay value 806b. A change in an intra-TEG may be considered as a change of a respective mean and/or uncertainty value(s). The span of the respective delay times may be based on physical and/or electronic properties of a station. For example, thermal issues may impact clock times and the orientation of antenna arrays may be associated with different delay times within a TEG. An intra-TEG delay shift 808 may be the difference between a first delay time (e.g., x ns) and a second delay time (e.g., y ns). For example, the first delay may be 1 ns and the second delay may be 2 ns. Both of these delay times are within the first TEG 802 and may yield different positioning results when a positioning algorithm expects the time delay to be constant across different measurements. A station may be configured to detect state changes associated with intra-TEG delay shifts. For example, sensors 213 (e.g., IMU) may detect a change in orientation. Thermal sensors may detect a change in temperature. Other sensors may be configured to detect other state changes of a station which may cause the intra-TEG delay shift 808. In operation, the station may be configured to provide an indication of the intra-TEG delay shift 808 with measurement reports to a positioning entity. The positioning entity may be configured to segregate measurement reports based on the intra-TEG delay. For example, measurements obtained with the first delay time (x ns) may be used in a first subset of positioning computations, and measurements obtained after the intra-TEG delay shift 808 (y ns) may be used in a second subset of positioning computations. The positioning entity may be configured to avoid combining measurements based on the first delay time and the second delay time.

Figure 9:
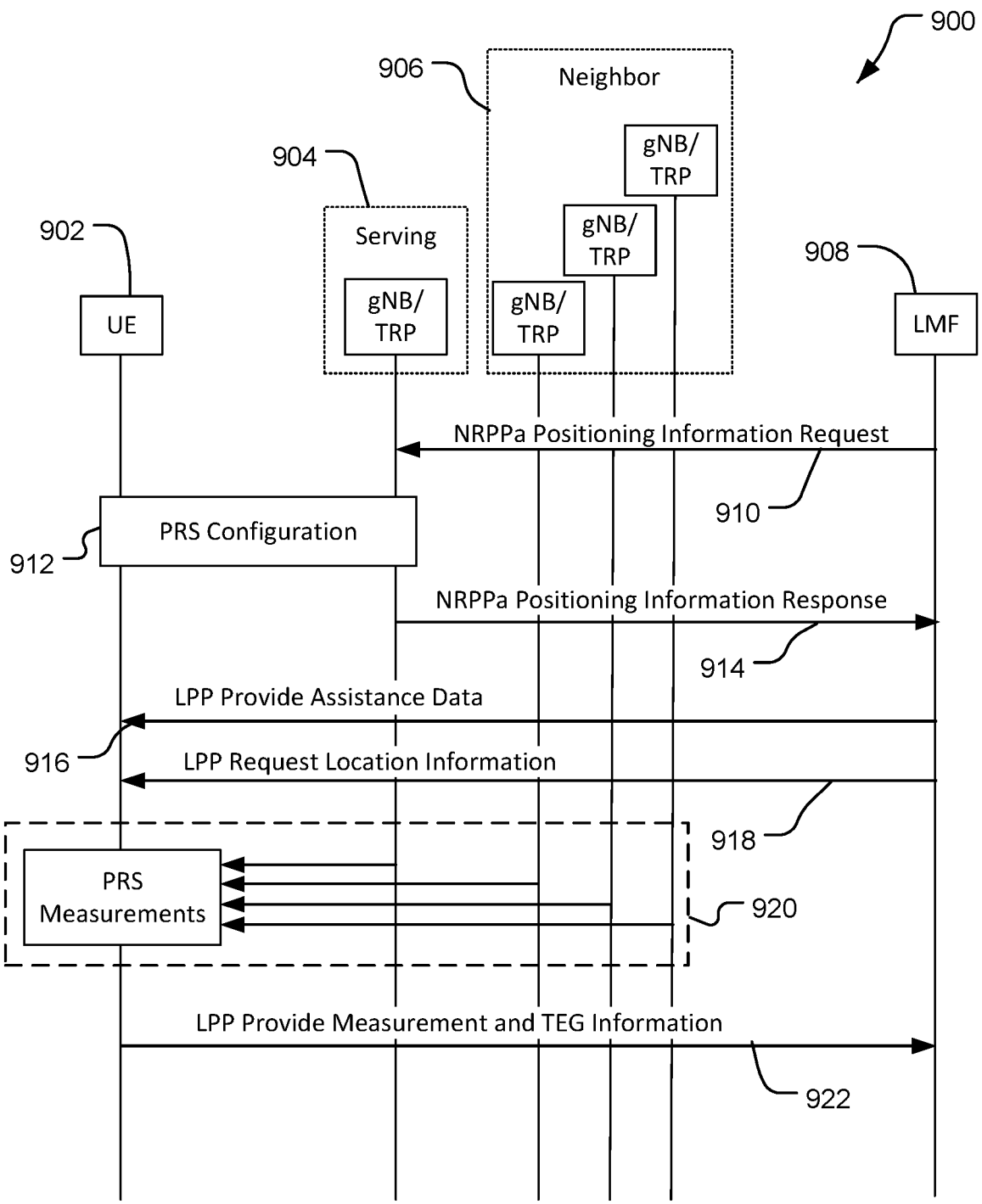
FIG. 9 is a message flow for an example reference signal positioning procedure.

For example, referring to FIG. 9, an example message flow 900 for a reference signal positioning procedure is shown. The flow 900 is an example only, as stages may be added, rearranged, and/or removed. The message flow 900 may include a target UE 902, a serving station 904, a plurality of neighboring stations 906, and a server 908. The UE 200 may be an example of the target UE 902, a TRP 300 such as the gNB 110a may be an example of the serving station 904, and a server 400 such as the LMF 120 may be an example of the server 908. The plurality of neighboring stations 906 may include base stations such as the gNB 110b, the eNB 114, or other stations such as neighboring UEs (e.g., configured for sidelink or other D2D communications). In an embodiment, the server 908 may request PRS configuration information for the target UE 902 from the serving station 904 via one or more positioning information request messages 910. The server 908 may provide assistance data to the serving station 904 including reference signal transmission properties such as a pathloss reference, spatial relation information, Synchronization Signal Block (SSB) configuration information, or other information required by the serving station 904 to determine a range to the target UE 902. At stage 912, the serving station 904 is configured to determine the resources available for PRS and configured the target UE 902 with the PRS resource sets. The target UE 902 may receive PRS resource configuration information from the serving station 904. The serving station 904 may provide the PRS configuration information to the server 908 via one or more positioning information response messages 914.

In an example, the server 908 may send a LPP provide assistance data message 916 to the target UE 902. The message may include assistance data to enable the UE to perform PRS measurements. The server 908 may also send a LPP request location information message 918 to request reference signal measurements from the target UE 902. At stage 920, the target UE 902 may measure PRS transmitted by the serving station 904 and/or the neighboring stations 906 and report the measurements to the server 908 via one or more provide measurement and TEG information messages 922. Multiple iterations of obtaining PRS measurements at stage 920 and providing the measurements in the subsequent provide measurement and TEG information messages 922 may occur. Before obtaining the PRS measurements, the UE 902 may determine if a state change associated with an intra-TEG delay has occurred and provide an indication of the TEG delay to the server 908. For example, the measurement reports in the provide measurement and TEG information messages 922 may include toggle fields, counter fields, or other information elements to indicate that a change in intra-TEG delay time occurred between measurements. The server 908 may be configured to segregate the measurement messages and/or individual measurements based on the change in the intra-TEG delay. For example, measurements obtained before the intra-TEG delay time change may form a first subset of measurements, and measurements obtained after the intra-TEG delay time change may form a second subset of measurements. The server 908 may utilize the segregated measurements to calculate the position of the target UE 902.

The message flow 900 is based on downlink PRS between the target UE 902 and the base stations 904, 906. Other positioning message flows may also utilize message reports to indicate a change in an intra-TEG delay time. For example, the message flow 900 may be extended to include UL PRS/SRS for positioning, and SL PRS signals transmitted from the target UE 902 and received by the base stations 904, 906 and/or neighboring UEs. Other positioning methods, such as RTT, multi-RTT, TDOA, RSTD, Rx-Tx and other positioning methods may utilize measurement reports with toggles, counters, and/or other information elements to indicate a change in an intra-TEG delay time. Each of the stations in a network, such as the UE 200 and the TRP 300, may be configured to provide reference signal measurement information and the corresponding TEG information to a positioning entity. In an example, the UE 200 may be configured to determine a location based on measurement and TEG information received from one or more base stations. In a V2X network, a RSU may be configured to provide measurement and TEG information to a positioning entity.

Figure 10:
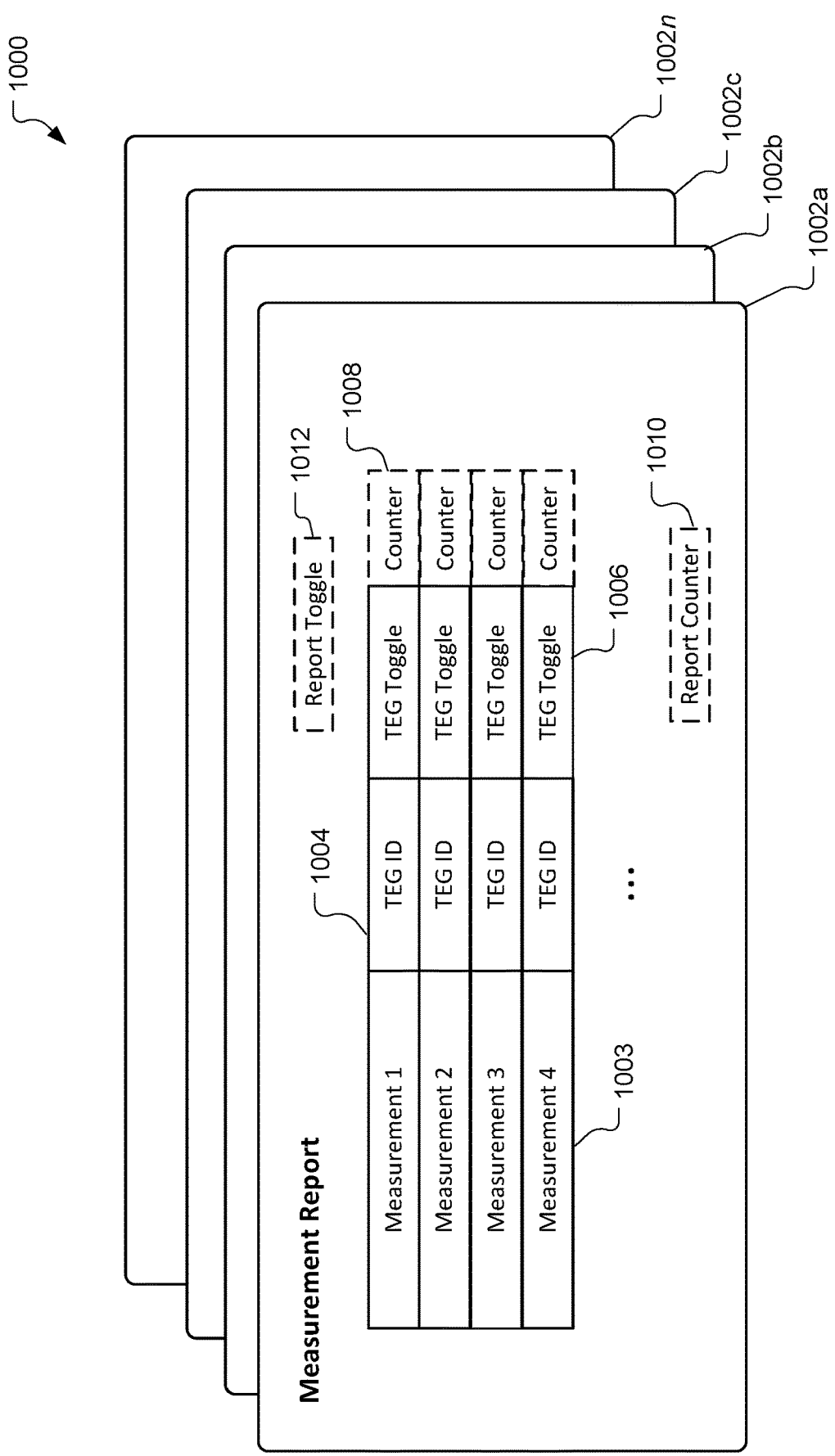
FIG. 10 are example reference signal measurement reports with timing error group update information elements.

Referring to FIG. 10, example reference signal measurement reports 1000 with timing error group (TEG) update information elements are shown. The measurement reports 1000 may be provided to a positioning entity within the communication network 100 via one or more signaling protocols such as LPP (e.g., from a UE to a LMF) and NRPP (e.g., from a base station to a LMF). Other messaging protocols and information elements such as Radio Resource Control (RRC), Medium Access Control (MAC) control elements (CE), Downlink Control Information (DCI), sidelink channels such as the PSSCH, PSCCH, PSBCH and other D2D interfaces may also be used to send reference signal measurement and TEG information. In an example, the measurement reports may be included in one or more provide measurement and TEG information messages 922. A first measurement report 1002a may be provided based on a first set of reference signal measurements obtained at stage 920. Additional reference signal measurements may be obtained and reported with the corresponding TEG information in additional measurement reports 1002b, 1002c, . . . 1002n. Each of the measurement reports 1000 may include one or more measurement fields 1003 based on the positioning technique. For example, the measurement fields may include ToA values for a plurality of PRS received by a station. Other positioning techniques such as TDoA, RSTD, OTDOA, RTT, multi-RTT, Rx-Tx, etc. may include other measurement fields in the reports. In an example, the measurement values may be associated with a TEG ID field 1004 to indicate the TEG the measurement values are based on. The TEG ID may be explicitly included in the measurement reports 1000 (e.g., via a TEG ID field 1004), or may be determined implicitly based on other measurement values (e.g., PRS ID, frequency, bandwidth, etc.). In an embodiment, the measurement reports 1000 may include a report toggle bit 1012 and/or a measurement toggle bit 1006 for each measurement value in a report. The toggle bits 1012, 1006 may be configured to indicate that the TEG is the same across reports or measurements until the toggle bit is toggled. For example, the measurement toggle bits 1006 may be used to indicate an intra-TEG change associated with a measurement value. That is, a measurement with a toggle bit of value (1) indicates the intra-TEG delay time has changed as compared to previous measurement values. A toggle bit value of (0) may indicate an absence of a change in the TEG delay time. In another example, the change of the toggle bit value (e.g., 0 to 1, or 1 to 0) may indicate the change in TEG delay time. In another example, the presence of the toggle bit (e.g., either 0 or 1) may indicate the change of TEG delay time. The report toggle bit 1012 may be used to indicate that at least one measurement in the report is based on an updated TEG delay. The toggle bits are configured to notify the positioning entity of the change in the TEG delay and enable segregation of measurement values based on like TEG delays. The toggle bits may be independent of the magnitude of the intra-TEG delay change and may just provide an indication that the TEG delay has changed between measurements. In an embodiment, the toggle bit design may be furthered combined with a measurement timer/counter field 1008 (e.g., a watchdog design). For example, an indication may be received to extend/reset the timer/counter before it expires. The measurement timer/counter field 1008 may represent the expiration time for a TEG definition by counting down or up. If the timer/counter value overflows, then the old TEG definition may expire. The toggle bit 1006 might be received before the timer/counter overflows and then the measurement timer/counter filed 1008 will be reset and starts from the default value. A report counter field 1010 may be used to indicate constant TEG definitions within a report. In an example, the timer/counter value may be sent in an initial report (e.g., a report which may initially define a TEG). In this example, the timer/counter may be a configuration option and may eliminate the requirement to send a TEG update in subsequent reports. In an example, a change of a toggle bit value, or a certain value of a toggle bit, or the presence of the toggle bit may reset the timer/counter value.

In an embodiment, each measurement report may include a toggle bit or counter value for a subset of measurements with the same TEG. For example, if a subset of measurements value are associated with the same TEG, then a toggle bit and/or counter value may be associated with that subset of measurement values. In an example, the toggle bit or counter value may be associated with a TEG ID field 1004.

In an embodiment, the counter fields 1008, 1010 may utilize multiple bits to indicate an update to the TEG delay value without using toggle bits. For example, a counter value may increase or decrease based on an update of the TEG delay value. A counter technique may utilize more signaling overhead as compared to the toggling bit technique, but the counters may avoid issues associated with transmission failures when a measurement report is not received by a positioning entity and a toggle bit is not detected. When the counter value changes, the positioning entity will know the TEG delay value has been reset. The measurement values may be segregated based on their respective counter values. In an embodiment, a combination of toggle bits and counter values may be used. For example, the measurement toggle bits 1006 may be used to indicate a TEG update or reset, and the report counter 1010 may be used to detect missing reports. In an example, the value of the report counter 1010 may change (e.g., +/−1) in each subsequent report. The report counter 1010 may be used to detect missing reports. If a positioning entity detects a missing measurement report, then it may request a retransmission of the missing measurement report and/or treat all the TEG delay values in the current report as new TEG delay values or the previous TEG delay values. In an embodiment, the value of the report counter 1010 may change (e.g., +/−1) when a subset of TEG delay values associated with the measurements 1003 change. If the value of the report counter 1010 remains the same, then the TEG definition is the same across reports, even though there might be a few missed reports in between. If the value of the report counter 1010 changes but the report or measurement toggle bits 1006, 1012 indicate no TEG update in one report, the positioning entity may determine that there are one or more missing reports and then classify the TEGs in the current measurement report based on a previously received measurement report (e.g., the most up-to-date measurement report) until a retransmission is received or the TEG condition is reported by the measuring station (e.g., gNB/UE).

Figure 11:
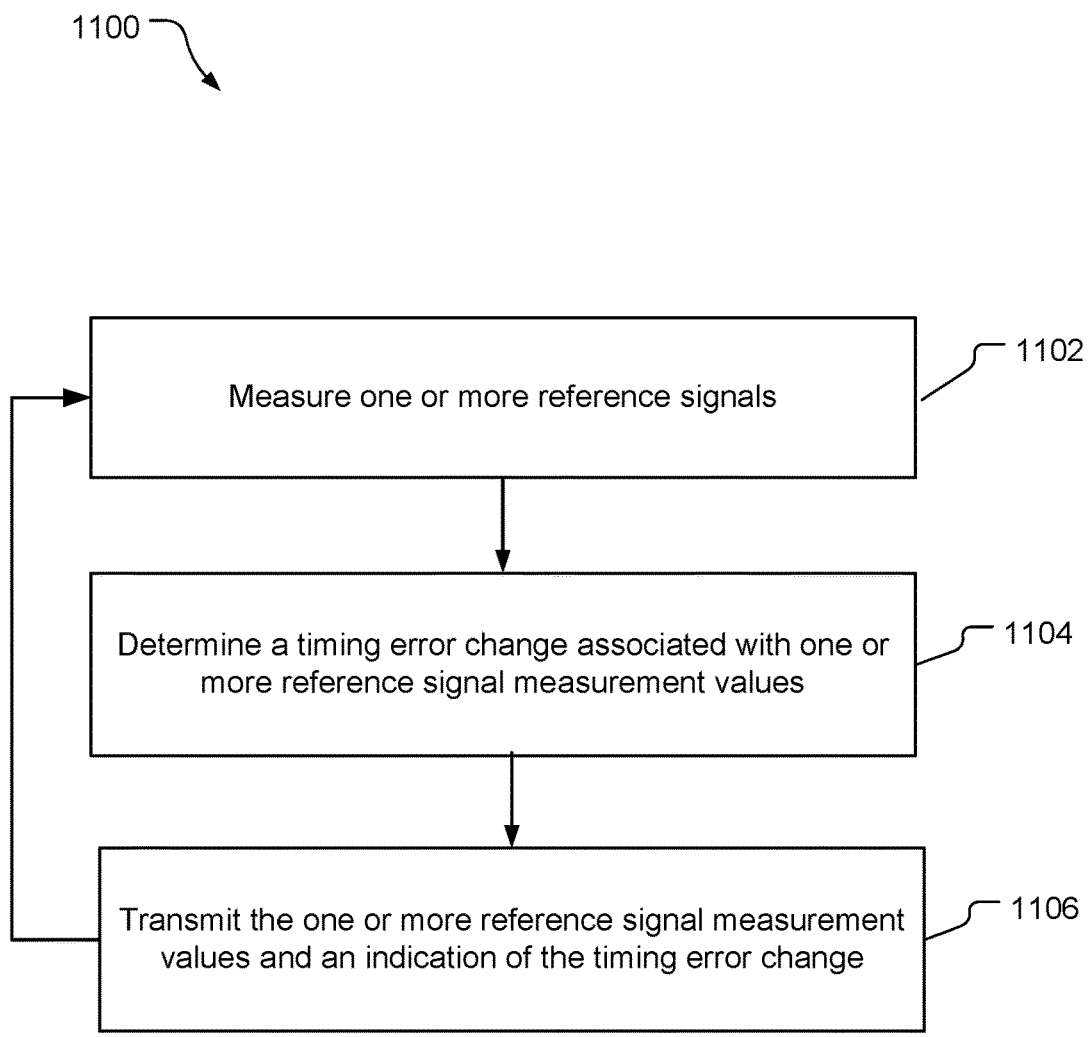
FIG. 11 is a block flow diagram of a method for providing reference signal measurement values.

Referring to FIG. 11, with further reference to FIGS. 1-10, a method 1100 for providing reference signal measurement values includes the stages shown. The method 1100 is, however, an example only and not limiting. The method 1100 may be altered, e.g., by having stages added, removed, rearranged, combined, performed concurrently, and/or having single stages split into multiple stages.

At stage 1102, the method includes measuring one or more reference signals. The UE 200, including the wireless transceiver 240 and the processor 230, and the TRP 300, including the wireless transceiver 340 and the processor 310, may be means for measuring the one or more reference signals. The reference signals may be PRS such as DL PRS transmitted by a base station (e.g., TRP 300) and received by a mobile station (e.g., UE 200), UL PRS or SRS for positioning transmitted by a mobile station and received by one or more base stations, and sidelink reference signals transmitted between mobile devices. The measurements may be based on various terrestrial positioning techniques and may include ToA, TDOA, RSTD, RTT, multi-RTT, Rx-Tx times, and other time of flight based measurements which may be modified based on timing error group correction/calibration information such as depicted in FIG. 7.

At stage 1104, the method includes determining a timing error change associated with one or more reference signal measurement values. The UE 200, including the processor 230, and the TRP 300, including the processor 310, may be means for determining a timing error change associated with one or more reference signal measurement values. In an embodiment, a TEG may be associated with a range of delay values, such as the first range 802a depicted in FIG. 8. A station such as the UE 200 and the TRP 300 may be configured with one or more sensors to detect changes in a device state such as orientation and temperature. The changes in device state may be associated with an intra-TEG delay value change. In an embodiment, an intra-TEG delay value change may be explicitly determined (e.g., 1, 2, 3, 5, 10 ns etc.) for each device state. In an embodiment, the intra-TEG delay values may be known in relative terms. For example, a first device temperature may be associated with a first TEG delay value and a second device temperature may be associated with a second TEG delay value, such that the first and second TEG delay values are not equal but the exact delay (e.g., the intra-TEG delay shift 808) is not known. Similarly, relative changes in orientation between reference signal measurements may be associated with different TEG delay values. Thus, a station may be configured to detect a change from a first state to a second state, and then determine the timing error change based on the change in state. That is, reference signals measured in the first device state may be presumed to be associated with a first TEG delay error and the reference signals measured in the second device state may be presumed to be associated with a second TEG delay error. Some positioning calculations may assume that TEG delay errors are consistent across measurements and do not require an exact value of the associated delays (e.g., TEG terms may cancel out in the positioning equations). In this case, signaling an indication of the state based change may be sufficient to enable the positioning entity to segregate the measurements based on like TEG values (e.g., segregated based on similar device states).

At stage 1106, the method includes transmitting the one or more reference signal measurement values and an indication of the timing error change. The UE 200, including the wireless transceiver 240 and the processor 230, and the TRP 300, including the wireless transceiver 340 and the processor 310, may be means for transmitting the one or more reference signal measurement values and an indication of the timing error change. In an embodiment, the measurement values and the indication of the timing error change may be included in one or more report messages such as the provide measurement and TEG information messages 922. The measurement values and the indication of the timing error change may be included in one or more messages based on LPP, NRPP, RCC, MAC-CE, DCI, or other messaging protocols in a wireless network. In general, the indication of the timing error change is configured to alert the positioning entity that the TEG assumptions for previous measurement values have changed for the current measurement values. For example, referring to FIG. 10, a measurement report 1002a may include measurement values 1003 and one or more toggle and/or counter fields to indicate the timing error change. The one or more reference signal measurement values 1003 may be transmitted in a report 1002a and the indication of the timing error change may include the toggle bit 1012 in the report 1002a. The indication of the timing error change may include the report counter value 1010. The indication of the timing error change may include the measurement toggle bits 1006 for each of the one or more reference signal measurements 1003. The indication of the timing error change may include the measurement counter values 1008 for each of the one or more reference signal measurements 1003 in combination with the respective measurement toggle bits 1006. The indication of the timing error change may include measurement counter values 1008 for each of the one or more reference signal measurements 1003 (i.e., without the toggle bits 1006). The indication of the timing error change may include a timing error group identification value 1004 for each of the one or more reference signal measurements 1003. The one or more reference signal measurement values and the indication of the timing error change may be transmitted to a position entity such as a location server (e.g., the LMF 120), a TRP 300, or another mobile device. The one or more reference signal measurement values and the indication of the timing error change may be transmitted via a sidelink communication protocol such as PSSCH, PSCCH, PSBCH or other D2D interfaces.

Figure 12:
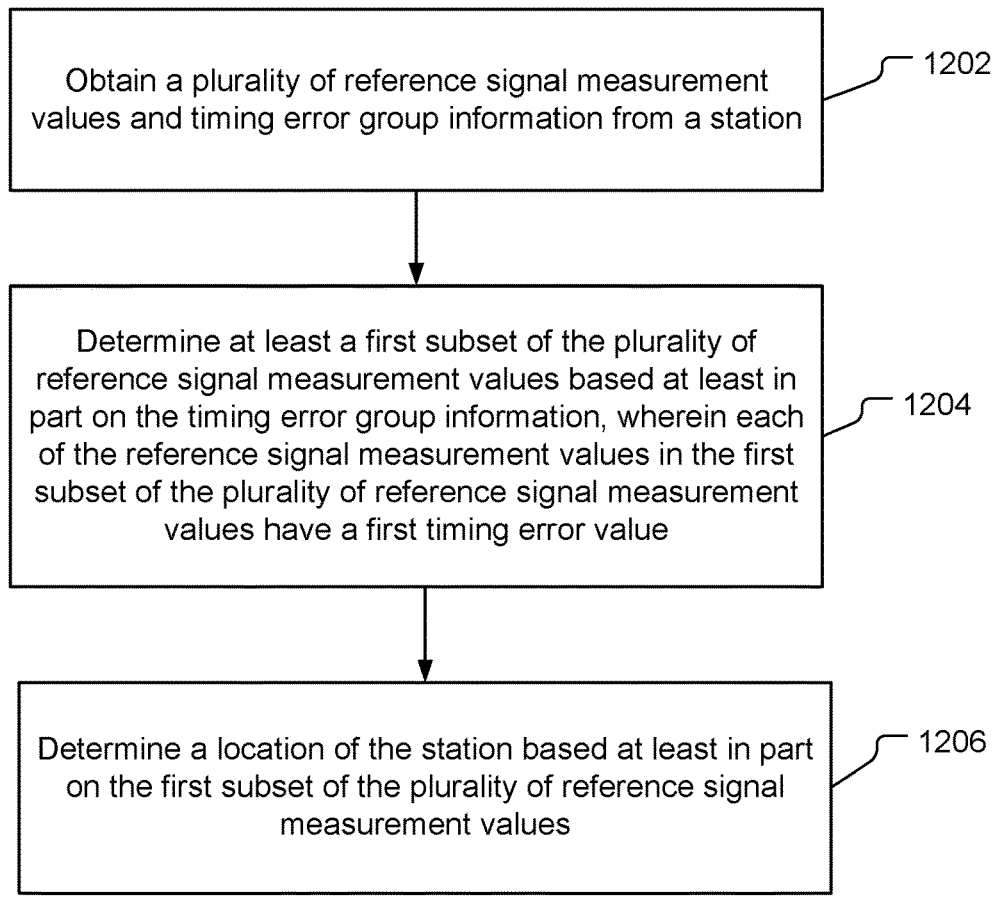
FIG. 12 is a block flow diagram of a method for determining a location of a station.

Referring to FIG. 12, with further reference to FIGS. 1-10, a method 1200 for determining a location of a station includes the stages shown. The method 1200 is, however, an example only and not limiting. The method 1200 may be altered, e.g., by having stages added, removed, rearranged, combined, performed concurrently, and/or having single stages split into multiple stages.

At stage 1202, the method includes obtaining a plurality of reference signal measurement values and timing error group information from a station. A server 400, such as the LMF 120 or another positioning entity, including a transceiver 415 and a processor 410, may be a means for obtaining the reference signal measurement values and timing error group information. In an embodiment, the plurality of reference signal measurement values and timing error group information may be obtained in one or more report messages such as the provide measurement and TEG information messages 922. In an example, a positioning entity may be a network server, such as the LMF 120, and the reference signal measurement values and timing error group information may be included in one or more messages based on LPP received from a mobile device, or NRPP messages received from a TRP 300. In an example, a positioning entity may be a station such as the TRP 300 and the reference signal measurement values and timing error group information may be included in one or more messages received from a mobile device via RCC, MAC-CE, DCI, or other wireless messaging protocols. In general, the timing error group is configured to enable the positioning entity to segregate the reference signal measurement values based on their respective timing error group delay values. For example, referring to FIG. 10, a measurement report 1002*a* may include measurement values 1003 and one or more toggle and/or counter fields to indicate the timing error change. In an example, the plurality of reference signal measurement values may be transmitted in a report and the timing error group information may include a toggle bit in the report. The timing error group information may include a counter value in the report. The timing error group information may include a toggle bit for each of the plurality of reference signal measurement values. The timing error group information may include a counter value for each of the plurality of reference signal measurement values. The timing error group information may include a timing error group identification value for each of the plurality of reference signal measurement values. In an embodiment, the plurality of reference signal measurement values and timing error group information may be received via a sidelink communication protocol such as PSSCH, PSCCH, PSBCH or other D2D interfaces.

At stage 1204, the method includes determining at least a first subset of the plurality of reference signal measurement values based at least in part on the timing error group information, wherein each of the reference signal measurement values in the first subset of the plurality of reference signal measurement values have a first timing error value. The server 400, including the processor 410, may be a means for determining at least a first subset of the plurality of reference signal measurement values. The server 400 may be configured to segregate the measurement messages and/or individual measurements based on the change in an intra-TEG delay as indicated in the timing error group information. Measurements obtained before the intra-TEG delay time change may form the first subset of measurements, and measurements obtained after the intra-TEG delay time change may form a second subset of measurements. In an example, referring to FIG. 10, the toggle bits 1012, 1006 may be configured to indicate that the intra-TEG delay time is the same across reports or measurements until the toggle bit is toggled. The measurement toggle bits 1006 may be used to indicate changes in the intra-TEG delay time for measurement values in the report. In general, a measurement with a toggle bit of value (1) indicates the intra-TEG delay time has changed as compared to previous measurement values. A toggle bit value of (0) may indicate an absence of a change in the TEG time delay. The report toggle bit 1012 may be used to indicate that at least one measurement in the report is based on an updated intra-TEG delay time. The toggle bits are configured to notify the positioning entity of the change in the intra-TEG delay time and enable segregation of measurement values based on like intra-TEG delays.

At stage 1206, the method includes determining the location of the station based at least in part on the first subset of the plurality of reference signal measurement values. The server 400, including the processor 410, may be a means for determining the location of the station. In an embodiment, the reference signal measurement values may include time-of-flight information associated with terrestrial positioning methods such as ToA, TDoA, RSTD, OTDOA, RTT, multi-RTT, Rx-Tx, and other positioning techniques. The server 400 may be configured to utilize the corresponding range computations and multilateration techniques associated with the first subset of reference signal measurement values to determine the location of the station. In an embodiment, the server 400 may be configured to determine at least a second subset of the plurality of reference signal measurement values based at least in part on the timing error group information, wherein each of the reference signal measurement values in the second subset of the plurality of reference signal measurement values is based on a second timing error value, and determine the location of the station based at least in part on the second subset of the plurality of reference signal measurement values. For example, the server 400 may utilize measurement reports received before an indication of an intra-TEG delay time change to perform position computations, and then utilize measurement reports received after an indication of the intra-TEG delay time change to perform position computations.

The method 1200 may be performed by a positioning entity such as the LMF 120. Other stations such as TRPs and UEs may also be configured to perform the method 1200 to determine the location of a station.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for providing reference signal measurement values with a mobile device, comprising:
   measuring one or more reference signals;
   determining a timing error change associated with one or more reference signal measurement values; and
   transmitting the one or more reference signal measurement values and an indication of the timing error change.

2. The method of clause 1 wherein the timing error change is based at least in part on an orientation of the mobile device relative to a transmission path of at least one of the one or more reference signals.

3. The method of clause 1 wherein the timing error change is based at least in part on a temperature of the mobile device.

4. The method of clause 1 wherein the one or more reference signal measurement values are transmitted in a report and the indication of the timing error change includes a toggle bit in the report.

5. The method of clause 1 wherein the indication of the timing error change includes a counter value in the report.

6. The method of clause 1 wherein the indication of the timing error change includes a toggle bit for each of the one or more reference signal measurement values.

7. The method of clause 6 wherein the indication of the timing error change includes a counter value for each of the one or more reference signal measurement values.

8. The method of clause 1 wherein the indication of the timing error change includes a counter value for each of the one or more reference signal measurement values.

9. The method of clause 1 wherein the indication of the timing error change includes a timing error group identification value for each of the one or more reference signal measurement values.

10. The method of clause 1 wherein the one or more reference signal measurement values and the indication of the timing error change are transmitted to a location server.

11. The method of clause 1 wherein the one or more reference signal measurement values and the indication of the timing error change are transmitted to a user equipment.

12. The method of clause 1 wherein the one or more reference signal measurement values and the indication of the timing error change are transmitted via a sidelink communication protocol.

13. A method for determining a location of a station, comprising:
obtaining a plurality of reference signal measurement values and timing error group information from the station;
determining at least a first subset of the plurality of reference signal measurement values based at least in part on the timing error group information, wherein each of the plurality of reference signal measurement values in the first subset of the plurality of reference signal measurement values have a first timing error value; and
determining the location of the station based at least in part on the first subset of the plurality of reference signal measurement values.

14. The method of clause 13 wherein the plurality of reference signal measurement values are transmitted in a report and the timing error group information includes a toggle bit in the report.

15. The method of clause 13 wherein the timing error group information includes a counter value in the report.

16. The method of clause 13 wherein the timing error group information includes a toggle bit for each of the plurality of reference signal measurement values.

17. The method of clause 13 wherein the timing error group information includes a counter value for each of the plurality of reference signal measurement values.

18. The method of clause 13 wherein the timing error group information includes a timing error group identification value for each of the plurality of reference signal measurement values.

19. The method of clause 13 wherein the plurality of reference signal measurement values and the timing error group information are received from a user equipment.

20. The method of clause 13 wherein the plurality of reference signal measurement values and the timing error group information are received via a sidelink communication protocol.

21. The method of clause 13 further comprising:
determining at least a second subset of the plurality of reference signal measurement values based at least in part on the timing error group information, wherein each of the plurality of reference signal measurement values in the second subset of the plurality of reference signal measurement values is based on a second timing error value; and
determining the location of the station based at least in part on the second subset of the plurality of reference signal measurement values.

22. An apparatus, comprising:
a memory;
at least one transceiver;
at least one processor communicatively coupled to the memory and the at least one transceiver, and configured to:
measure one or more reference signals;
determine a timing error change associated with one or more reference signal measurement values; and
transmit the one or more reference signal measurement values and an indication of the timing error change.

23. The apparatus of clause 22 wherein the at least one processor is further configured to determine an orientation of the apparatus relative to a transmission path of at least one of the one or more reference signals, wherein the timing error change is based at least in part on the orientation of the apparatus.

24. The apparatus of clause 22 further comprising at least one temperature sensor, wherein the at least one processor is configured to determine the timing error change based at least in part on a measurement obtained with the at least one temperature sensor.

25. The apparatus of clause 22 wherein the one or more reference signal measurement values are transmitted in a report and the indication of the timing error change include at least one of a report toggle bit, a report counter value, a measurement toggle bit, and a measurement counter value in the report.

26. The apparatus of clause 22 wherein the at least one processor is further configured to transmit the one or more reference signal measurement values and the indication of the timing error change via a sidelink communication protocol.

27. An apparatus, comprising:
a memory;
at least one transceiver;
at least one processor communicatively coupled to the memory and the at least one transceiver, and configured to:
obtain a plurality of reference signal measurement values and timing error group information from a station;
determine at least a first subset of the plurality of reference signal measurement values based at least in part on the timing error group information, wherein each of the plurality of reference signal measurement values in the first subset of the plurality of reference signal measurement values have a first timing error value; and
determine a location of the station based at least in part on the first subset of the plurality of reference signal measurement values.

28. The apparatus of clause 27 wherein the plurality of reference signal measurement values are transmitted in a report and the timing error group information include at least one of a report toggle bit, a report counter value, a measurement toggle bit, and a measurement counter value in the report.

29. The apparatus of clause 27 wherein the at least one processor is further configured to receive the plurality of reference signal measurement values and the timing error group information via a sidelink communication protocol.

30. The apparatus of clause 27 wherein the at least one processor is further configured to:
determine at least a second subset of the plurality of reference signal measurement values based at least in part on the timing error group information, wherein each of the plurality of reference signal measurement values in the second subset of the plurality of reference signal measurement values is based on a second timing error value; and
determine the location of the station based at least in part on the second subset of the plurality of reference signal measurement values.

31. An apparatus for providing reference signal measurement values with a mobile device, comprising:
means for measuring one or more reference signals;
means for determining a timing error change associated with one or more reference signal measurement values; and
means for transmitting the one or more reference signal measurement values and an indication of the timing error change.

32. The apparatus of clause 31 further comprising means for determining an orientation of the apparatus relative to a transmission path of at least one of the one or more reference signals, wherein the timing error change is based at least in part on the orientation of the apparatus.

33. The apparatus of clause 31 further comprising means for measuring a temperature, wherein the timing error change is based at least in part on a temperature measurement.

34. The apparatus of clause 31 wherein the one or more reference signal measurement values are transmitted in a report and the indication of the timing error change include at least one of a report toggle bit, a report counter value, a measurement toggle bit, and a measurement counter value.

35. The apparatus of clause 31 further comprising means for transmitting the one or more reference signal measurement values and the indication of the timing error change via a sidelink communication protocol.

36. An apparatus for determining a location of a station, comprising:
means for obtaining a plurality of reference signal measurement values and timing error group information from the station;
means for determining at least a first subset of the plurality of reference signal measurement values based at least in part on the timing error group information, wherein each of the plurality of reference signal measurement values in the first subset of the plurality of reference signal measurement values have a first timing error value; and
means for determining the location of the station based at least in part on the first subset of the plurality of reference signal measurement values.

37. The apparatus of clause 36 wherein the plurality of reference signal measurement values are transmitted in a report and the timing error group information include at least one of a report toggle bit, a report counter value, a measurement toggle bit, and a measurement counter value.

38. The apparatus of clause 36 further comprising means for receiving the plurality of reference signal measurement values and the timing error group information via a sidelink communication protocol.

39. The apparatus of clause 36 further comprising:
means for determining at least a second subset of the plurality of reference signal measurement values based at least in part on the timing error group information, wherein each of the plurality of reference signal measurement values in the second subset of the plurality of reference signal measurement values is based on a second timing error value; and
means for determining the location of the station based at least in part on the second subset of the plurality of reference signal measurement values.

40. A non-transitory processor-readable storage medium comprising processor-readable instructions configured to cause one or more processors to provide reference signal measurement values with a mobile device, comprising:
code for measuring one or more reference signals;
code for determining a timing error change associated with one or more reference signal measurement values; and
code for transmitting the one or more reference signal measurement values and an indication of the timing error change.

41. The non-transitory processor-readable storage medium of clause 40 further comprising code for determining an orientation of the apparatus relative to a transmission path of at least one of the one or more reference signals, wherein the timing error change is based at least in part on the orientation of the mobile device.

42. The non-transitory processor-readable storage medium of clause 40 further comprising code for measuring a temperature and determining the timing error change based at least in part on a temperature measurement.

43. The non-transitory processor-readable storage medium of clause 40 wherein the one or more reference signal measurement values are transmitted in a report and the indication of the timing error change include at least one of a report toggle bit, a report counter value, a measurement toggle bit, and a measurement counter value.

44. The non-transitory processor-readable storage medium of clause 40 further comprising code for transmitting the one or more reference signal measurement values and the indication of the timing error change via a sidelink communication protocol.

45. A non-transitory processor-readable storage medium comprising processor-readable instructions configured to cause one or more processors to determine a location of a station, comprising:
code for obtaining a plurality of reference signal measurement values and timing error group information from the station;
code for determining at least a first subset of the plurality of reference signal measurement values based at least in part on the timing error group information, wherein each of the plurality of reference signal measurement values in the first subset of the plurality of reference signal measurement values have a first timing error value; and
code for determining the location of the station based at least in part on the first subset of the plurality of reference signal measurement values.

46. The non-transitory processor-readable storage medium of clause 45 wherein the plurality of reference signal measurement values are transmitted in a report and the timing error group information include at least one of a report toggle bit, a report counter value, a measurement toggle bit, and a measurement counter value.

47. The non-transitory processor-readable storage medium of clause 45 further comprising code for receiving the plurality of reference signal measurement values and the timing error group information via a sidelink communication protocol.

48. The non-transitory processor-readable storage medium of clause 45 further comprising:
code for determining at least a second subset of the plurality of reference signal measurement values based at least in part on the timing error group information, wherein each of the plurality of reference signal measurement values in the second subset of the plurality of reference signal measurement values is based on a second timing error value; and
code for determining the location of the station based at least in part on the second subset of the plurality of reference signal measurement values.

The invention claimed is:

1. A method for providing reference signal measurement values with a mobile device, comprising:
measuring one or more reference signals;
determining a timing error change associated with one or more reference signal measurement values; and
transmitting the one or more reference signal measurement values and an indication of the timing error change.

2. The method of claim 1 wherein the timing error change is based at least in part on an orientation of the mobile device relative to a transmission path of at least one of the one or more reference signals.

3. The method of claim 1 wherein the timing error change is based at least in part on a temperature of the mobile device.

4. The method of claim 1 wherein the one or more reference signal measurement values are transmitted in a report and the indication of the timing error change includes a toggle bit in the report.

5. The method of claim 1 wherein the indication of the timing error change includes a counter value in a report.

6. The method of claim 1 wherein the indication of the timing error change includes a toggle bit for each of the one or more reference signal measurement values.

7. The method of claim 6 wherein the indication of the timing error change includes a counter value for each of the one or more reference signal measurement values.

8. The method of claim 1 wherein the indication of the timing error change includes a counter value for each of the one or more reference signal measurement values.

9. The method of claim 1 wherein the indication of the timing error change includes a timing error group identification value for each of the one or more reference signal measurement values.

10. The method of claim 1 wherein the one or more reference signal measurement values and the indication of the timing error change are transmitted to a location server.

11. The method of claim 1 wherein the one or more reference signal measurement values and the indication of the timing error change are transmitted to a user equipment.

12. The method of claim 1 wherein the one or more reference signal measurement values and the indication of the timing error change are transmitted via a sidelink communication protocol.

13. A method for determining a location of a station, comprising:
obtaining a plurality of reference signal measurement values and timing error group information from the station;
determining at least a first subset of the plurality of reference signal measurement values based at least in part on the timing error group information, wherein each of the plurality of reference signal measurement values in the first subset of the plurality of reference signal measurement values have a first timing error value; and
determining the location of the station based at least in part on the first subset of the plurality of reference signal measurement values.

14. The method of claim 13 wherein the plurality of reference signal measurement values are transmitted in a report and the timing error group information includes a toggle bit in the report.

15. The method of claim 13 wherein the timing error group information includes a counter value in a report.

16. The method of claim 13 wherein the timing error group information includes a toggle bit for each of the plurality of reference signal measurement values.

17. The method of claim 13 wherein the timing error group information includes a counter value for each of the plurality of reference signal measurement values.

18. The method of claim 13 wherein the timing error group information includes a timing error group identification value for each of the plurality of reference signal measurement values.

19. The method of claim 13 wherein the plurality of reference signal measurement values and the timing error group information are received from a user equipment.

20. The method of claim 13 wherein the plurality of reference signal measurement values and the timing error group information are received via a sidelink communication protocol.

21. The method of claim 13 further comprising:
determining at least a second subset of the plurality of reference signal measurement values based at least in part on the timing error group information, wherein each of the plurality of reference signal measurement values in the second subset of the plurality of reference signal measurement values is based on a second timing error value; and
determining the location of the station based at least in part on the second subset of the plurality of reference signal measurement values.

22. An apparatus, comprising:
a memory;
at least one transceiver;
at least one processor communicatively coupled to the memory and the at least one transceiver, and configured to:
measure one or more reference signals;
determine a timing error change associated with one or more reference signal measurement values; and
transmit the one or more reference signal measurement values and an indication of the timing error change.

23. The apparatus of claim 22 wherein the at least one processor is further configured to determine an orientation of the apparatus relative to a transmission path of at least one of the one or more reference signals, wherein the timing error change is based at least in part on the orientation of the apparatus.

24. The apparatus of claim 22 further comprising at least one temperature sensor, wherein the at least one processor is configured to determine the timing error change based at least in part on a measurement obtained with the at least one temperature sensor.

25. The apparatus of claim 22 wherein the one or more reference signal measurement values are transmitted in a report and the indication of the timing error change include at least one of a report toggle bit, a report counter value, a measurement toggle bit, and a measurement counter value in the report.

26. The apparatus of claim 22 wherein the at least one processor is further configured to transmit the one or more reference signal measurement values and the indication of the timing error change via a sidelink communication protocol.

27. An apparatus, comprising:
a memory;
at least one transceiver;
at least one processor communicatively coupled to the memory and the at least one transceiver, and configured to:
  obtain a plurality of reference signal measurement values and timing error group information from a station;
  determine at least a first subset of the plurality of reference signal measurement values based at least in part on the timing error group information, wherein each of the plurality of reference signal measurement values in the first subset of the plurality of reference signal measurement values have a first timing error value; and
  determine a location of the station based at least in part on the first subset of the plurality of reference signal measurement values.

28. The apparatus of claim 27 wherein the plurality of reference signal measurement values are transmitted in a report and the timing error group information include at least one of a report toggle bit, a report counter value, a measurement toggle bit, and a measurement counter value in the report.

29. The apparatus of claim 27 wherein the at least one processor is further configured to receive the plurality of reference signal measurement values and the timing error group information via a sidelink communication protocol.

30. The apparatus of claim 27 wherein the at least one processor is further configured to:
determine at least a second subset of the plurality of reference signal measurement values based at least in part on the timing error group information, wherein each of the plurality of reference signal measurement values in the second subset of the plurality of reference signal measurement values is based on a second timing error value; and
determine the location of the station based at least in part on the second subset of the plurality of reference signal measurement values.

* * * * *